(12) United States Patent
Kang et al.

(10) Patent No.: US 11,776,716 B2
(45) Date of Patent: Oct. 3, 2023

(54) CIRCUIT PROTECTION DEVICE

(71) Applicant: SMART ELECTRONICS INC., Ulsan (KR)

(72) Inventors: Doo Won Kang, Ulsan (KR); Hwang Je Mun, Busan (KR); A Lam Shin, Busan (KR)

(73) Assignee: SMART ELECTRONICS INC., Ulsan (KR)

( * ) Notice: Subject to any disclaimer, the term of this patent is extended or adjusted under 35 U.S.C. 154(b) by 0 days.

(21) Appl. No.: 17/677,058

(22) Filed: Feb. 22, 2022

(65) Prior Publication Data

US 2022/0293304 A1    Sep. 15, 2022

(30) Foreign Application Priority Data

Mar. 12, 2021    (KR) .......................... 10-2021-0032398

(51) Int. Cl.
| | | |
|---|---|---|
| H01C 1/14 | (2006.01) | |
| H01C 1/022 | (2006.01) | |
| H01C 7/04 | (2006.01) | |
| H02H 9/02 | (2006.01) | |

(52) U.S. Cl.
CPC ........... *H01C 1/1413* (2013.01); *H01C 1/022* (2013.01); *H01C 7/041* (2013.01); *H02H 9/02* (2013.01)

(58) Field of Classification Search
CPC ........ H01C 1/1413; H01C 1/022; H01C 7/04; H01C 7/041; G01K 7/16; H02H 9/02
See application file for complete search history.

(56) References Cited

U.S. PATENT DOCUMENTS

| | | | | |
|---|---|---|---|---|
| 5,504,371 A | * | 4/1996 | Niimi ..................... | H01C 7/045 257/745 |
| 5,691,689 A | | 11/1997 | Smith et al. | |
| 5,760,336 A | * | 6/1998 | Wang ..................... | H01C 1/024 338/234 |
| 6,242,998 B1 | * | 6/2001 | Mihara .................. | H01C 1/014 338/276 |
| 8,400,253 B2 | * | 3/2013 | Jung ...................... | H01H 69/02 337/182 |
| 10,115,503 B2 | * | 10/2018 | Mitchell ................. | G01K 1/14 |

(Continued)

FOREIGN PATENT DOCUMENTS

| | | |
|---|---|---|
| CN | 203659564 U | 6/2014 |
| JP | S5649501 A | 5/1981 |

(Continued)

OTHER PUBLICATIONS

JP-H11135304, machine translation. (Year: 1999).*

(Continued)

*Primary Examiner* — Kyung S Lee
(74) *Attorney, Agent, or Firm* — Harness, Dickey & Pierce, P.L.C.

(57) ABSTRACT

The present invention relates to a circuit protection device including: a device comprising a heating element configured to comprise a body and a pair of electrodes formed on the body, and a pair of lead wires connected, respectively, to the pair of electrodes; and a case having an independent accommodating space formed therein to accommodate at least the heating element, wherein the case includes at least one heat insulating layer disposed in the vicinity of the accommodating space.

11 Claims, 14 Drawing Sheets

(56) References Cited

U.S. PATENT DOCUMENTS

2018/0183232 A1    6/2018  Tavcar et al.
2021/0065939 A1*   3/2021  Li ............................ H01C 7/02

FOREIGN PATENT DOCUMENTS

| | | | |
|---|---|---|---|
| JP | S61100904 A | | 5/1986 |
| JP | H07201520 A | | 8/1995 |
| JP | H0997705 A | | 4/1997 |
| JP | H11135304 | * | 5/1999 |
| JP | H11135304 A | | 5/1999 |
| JP | 2000208356 A | | 7/2000 |
| JP | 2013-030749 A | | 2/2013 |
| KR | 10-2010-0115979 A | | 10/2010 |
| KR | 10-1684808 B1 | | 12/2016 |
| KR | 10-2020-0004551 A | | 1/2020 |
| TW | 388037 B | | 4/2000 |

OTHER PUBLICATIONS

Office Action from corresponding Korean Patent Application No. 10-2021-0032398, dated Apr. 14, 2021.
Office Action from corresponding Japanese Patent Application No. 2022-025242, dated May 17, 2023.
Office Action from corresponding Taiwan Patent Application No. 11220495680, dated May 24, 2023.

* cited by examiner

| PRODUCT | ICL 5Ω | ICM 5Ω |
|---|---|---|
| BEFORE TEST (Ω) | 5.201 | 5.201 |
| APPLIED CURRENT (A) | 3.5 | 3.5 |
| APPLIED VOLTAGE(V) | 0.960 | 0.597 |
| RESISTANCE (Ω) | 0.274 | 0.171 |
| POWER (W) | 3.357 | 2.095 |
| APPLIED TIME (MINUTES) | 20 | 20 |
| HEATING TEMPERATURE (°C) |  111.7 |  82.1 |
| Size |  L : 20mm / H : 24mm / W : 9.5mm |  L : 22.5mm / H : 27mm / W : 10mm |

| PRODUCT | ICL 5Ω | ICM 5Ω | | | | |
|---|---|---|---|---|---|---|
| | | ONE-SIDE | TWO-SIDE | THREE-SIDE | FOUR-SIDE | FIVE-SIDE |
| BEFORE TEST (Ω) | 5.201 | 5.203 | 5.201 | 5.198 | 5.195 | 5.200 |
| APPLIED CURRENT (A) | 3.5 | 3.5 | 3.5 | 3.5 | 3.5 | 3.5 |
| APPLIED VOLTAGE (V) | 0.960 | 0.605 | 0.597 | 0.600 | 0.594 | 0.597 |
| RESISTANCE (Ω) | 0.274 | 0.173 | 0.171 | 0.171 | 0.170 | 0.171 |
| POWER (W) | 3.357 | 2.119 | 2.095 | 2.095 | 2.083 | 2.095 |
| APPLIED TIME (MINUTES) | 20 | 20 | 20 | 20 | 20 | 20 |
| HEATING TEMPERATURE (°C) | 111.7 | 92.3 | 82.1 | 87.5 | 79.7 | 75.3 |
| SHAPE | | | | | | |

FIG. 14

CIRCUIT PROTECTION DEVICE

CROSS-REFERENCE TO RELATED APPLICATION

This application claims the benefit under 35 USC § 119(a) of Korean Patent Application No. 10-2021-0032398, filed on Mar. 12, 2021, in the Korean Intellectual Property Office, the entire disclosure of which is incorporated herein by reference for all purposes.

FIELD

The present description relates to a circuit protection device, and more particularly, to a circuit protection device for limiting inrush current during initial driving of an electronic product and preventing a fire due to an internal temperature rise or overcurrent.

BACKGROUND

In general, a circuit protection device for protecting a power circuit is installed on a power input terminal of an electric circuit of a large-sized electronic appliance, such as a TV, a washing machine, an air conditioner, a refrigerator, a dryer, or the like, to prevent appliance malfunction caused by inrush current, or overcurrent, such as surge current, occurring when the electronic appliance is powered on.

Here, the inrush current may be defined as the large amount of the current value that is temporarily generated in a circuit when power of an electric appliance is turned on. A large inrush current may exceed a current limit value of a semiconductor device including a diode used at a power device, or a spike voltage generated due to the exceedingly large inrush current causes damage to the semiconductor device.

FIG. 1 is a diagram schematically illustrating the configuration and operation of a circuit protection device for protecting a circuit from inrush current according to a prior art. The circuit protection device according to the prior art includes a resistor R, a first relay S1 connected in series to the resistor R, and a second relay S2 connected in parallel to the first relay S1.

At the point in time when the circuit protection device is supplied with power and driven, the circuit protection device enters into state (a) in which the first relay S1 is closed and the second relay S2 is open, and after a predetermined period of time, the state of the circuit protection device is switched to state (b) in which the first relay S1 is opened and the second relay S2 is closed.

In state (a) shown in FIG. 1, an input current is input to an electric circuit, passing through the first relay S1 and the resistor R. In this case, the resistor R limits an inrush current to a predetermined current, so that the inrush current disappears. After a predetermined period of time (e.g., within approximately 0.5 seconds) during which the input current is stabilized, the state of the circuit protection device is switched to state (b) and the input current in steady state is input to the electric circuit through the second relay S2.

Since the circuit protection device according to the prior art is composed of three parts including the resistor R and the relatively bulky first and second relays S1 and S2, there are a number of drawbacks that may involve high cost, frequent malfunction, and space consumption. In addition, steady state input current may range from 2 A to 4 A or more in the case of a washing machine, and may be 7 A or more in the case of a dryer. Therefore, it is necessary to use high-current relays for the first relay S1 and the second relay S2. Here, since the high-current relays are high-priced and there are less commercialized domestic goods, most high-current relays have to be imported from Japan and the like.

In addition, operations of the first relay S1 and the second relay S2 being opened and closed are repetitively performed whenever an electronic appliance is turned on or off, and thus, as the electronic appliance is used for a long time, durability of the relays decreases and malfunctions occur. Malfunctions of the first relay S1 and the second relay S2 may cause an inflow of overcurrent or even a fire. Accordingly, such risks are inherent all the time in the circuit protection device that use relays.

In order to address such problems, a circuit protection device that lowers inrush current using a negative temperature coefficient (NTC) thermistor or the like is being used. Thermistor is a device that uses resistivity of a semiconductor that changes in response to a change in temperature, and an NTC thermistor device has a characteristic that the resistance value reduces when the temperature increases. The NTC thermistor device may include a disc-shaped body, a pair of electrodes formed on opposite surfaces of the body, and a pair of lead lines soldered to each electrode and extending.

The prior art, such as Korean Patent Registration No. 10-1189853, discloses a circuit protection device (ceramic heat dissipation element, Inrush Current Limiter (ICL)) with improved heat dissipation property by putting an NTC thermistor device in a ceramic case and filling the ceramic case with a cement-based filler material. This ceramic heat dissipation element according to the prior art is called ICL (Inrush Current Limiter) in this specification. Also a circuit protection device according to an exemplary embodiment of the present invention is called ICM (Inrush Current limiter injection Molding) in this specification.

Such a ceramic heat dissipation element (ICL) according to the prior art does not have a major problem when applied to home appliances, such as a conventional 40-inch TV with less than 200 W power consumption, and two to four ceramic heat dissipation elements connected in series can be used in home appliances with a power consumption of approximately 200 W. For example, when four ceramic heat dissipation elements (ICL) are connected in series and the circuit protection device is to be controlled with a resistance value of approximately 5 ohms in an electronic appliance, such as a TV, the resistance value of each ceramic heat dissipation element is 1.3 ohms. Compared to one ceramic heat dissipation element (ICL) having a resistance value of 5 ohms, four ceramic heat dissipation elements each having a resistance value of 1.3 ohms generate less heat ($P=I^2R$, Joule heat), which is more advantageous in terms of heat management.

However, when it is desired to apply the conventional ceramic heat dissipation element (ICL) to home appliances that require large power consumption in excess of 200 W, such as a recently commercialized 65-inch or larger TV, it is necessary to connect five or more ceramic heat dissipation elements (ICL) each having a resistance value of less than 1.3 ohms. In reality, it is difficult to make an NTC thermistor having a resistance value of less than 1.3 ohms, and even if such an NTC thermistor is made, the NTC thermistor having a resistance value of less than 1.3 ohms may not practically exhibit the characteristics of an NTC thermistor.

Therefore, in the case of home appliances that require large power consumption in excess of 200 W, such as a 65-inch or larger TV, it is not possible to simply connect the ceramic heat dissipation elements (ICL) in series for use as described above. One ceramic heat dissipation element (ICL) having a predetermined resistance value (e.g., 5 ohms) in order to cope with the heat generated due to high current has to be used as a resistor R in the circuit that uses the first relay S1 and the second relay S2 according to the prior art as shown in FIG. 1.

However, when all of the first relay S1, the second relay S2, and the ceramic heat dissipation element (ICL) are used in this way, the cost is high, a large space is occupied, and the aforementioned mechanical malfunction and durability issues of the first relay S1 and the second relay S2 are still present. Accordingly, there is a demand for an improved circuit protection device.

PRIOR ART DOCUMENT

Patent Document (Patent Document 0001) Korean Patent Registration No. 10-1189853 (registered on Oct. 4, 2012)

SUMMARY

The present invention has been conceived to solve the aforementioned problems, and aims to provide a circuit protection device capable of effectively managing heat even when used in home appliances that require large power consumption in excess of 200 W, and reducing manufacturing coast without occupying a large space.

In one general aspect, there is provided a circuit protection device including: a device including a heating element configured to include a body and a pair of electrodes formed on the body, and a pair of lead wires connected, respectively, to the pair of electrodes; and a case having an independent accommodating space formed therein to accommodate at least the heating element, wherein the case includes at least one heat insulating layer disposed in the vicinity of the accommodating space.

The heat insulating layer may be any one of an air layer, a vacuum layer, and a heat insulating material layer.

The device may be a negative temperature coefficient (NTC) thermistor device.

The case may include a housing having an open lower surface to allow the device to be inserted into the accommodating space, and a housing cover configured to close the open lower surface of the housing.

The housing may have a rectangular parallelepiped shape.

The heat insulating layer may be formed on at least one of the front side and the rear side of the accommodating space in the housing.

The heat insulating layer may be formed on an upper side of the accommodating space in the housing.

The heat insulating layer may be formed on at least one of the left and right sides of the accommodating space in the housing.

The case may be formed of plastic.

One of the housing and the housing cover may be formed of thermosetting plastic, and the other may be formed of thermoplastic plastic.

The housing may have a step formed on a front portion or a rear portion thereof so that a part of the front or rear portion of the housing can be inserted and installed into a housing insertion hole formed in a printed circuit board.

The housing may have a groove that accommodates a part of a printed circuit board when the part of the housing is inserted into a housing insertion hole formed in the printed circuit board.

BRIEF DESCRIPTION OF THE DRAWINGS

FIG. 14 is a table showing comparative test data for circuit protection devices according to various exemplary embodiments of the present invention.

DETAILED DESCRIPTION

Figure 1:
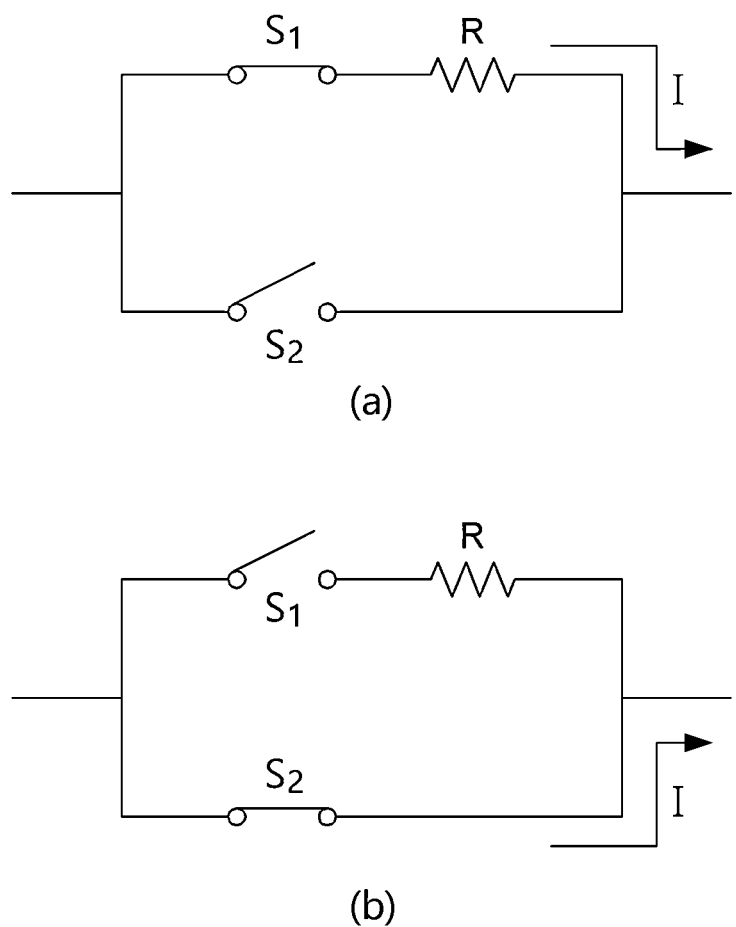
FIG. 1 is a diagram schematically illustrating the configuration and operation of a circuit protection device for protecting a circuit from inrush current according to a prior art.

Hereinafter, exemplary embodiments of the present invention will be described in detail with reference to the accompanying drawings. In the following descriptions and accompanying drawings, like reference numerals substantially refer to like elements, and as a result, a duplicated description will be omitted. Further, in describing exemplary embodiments of the present invention, well-known functions or constructions will not be described in detail since they may unnecessarily obscure the understanding of the present invention.

In describing the elements of this specification, terms, such as the first, second, A, B, a, and b, may be used. However, the terms are used to only distinguish one element from other elements, but the essence, order, and sequence of the elements are not limited by the terms.

Hereinafter, for convenience of description, in the drawings, the x-axis represents the left-to-right direction, the y-axis represents the vertical direction, and the z-axis represents the front-to-rear direction.

Figure 2:
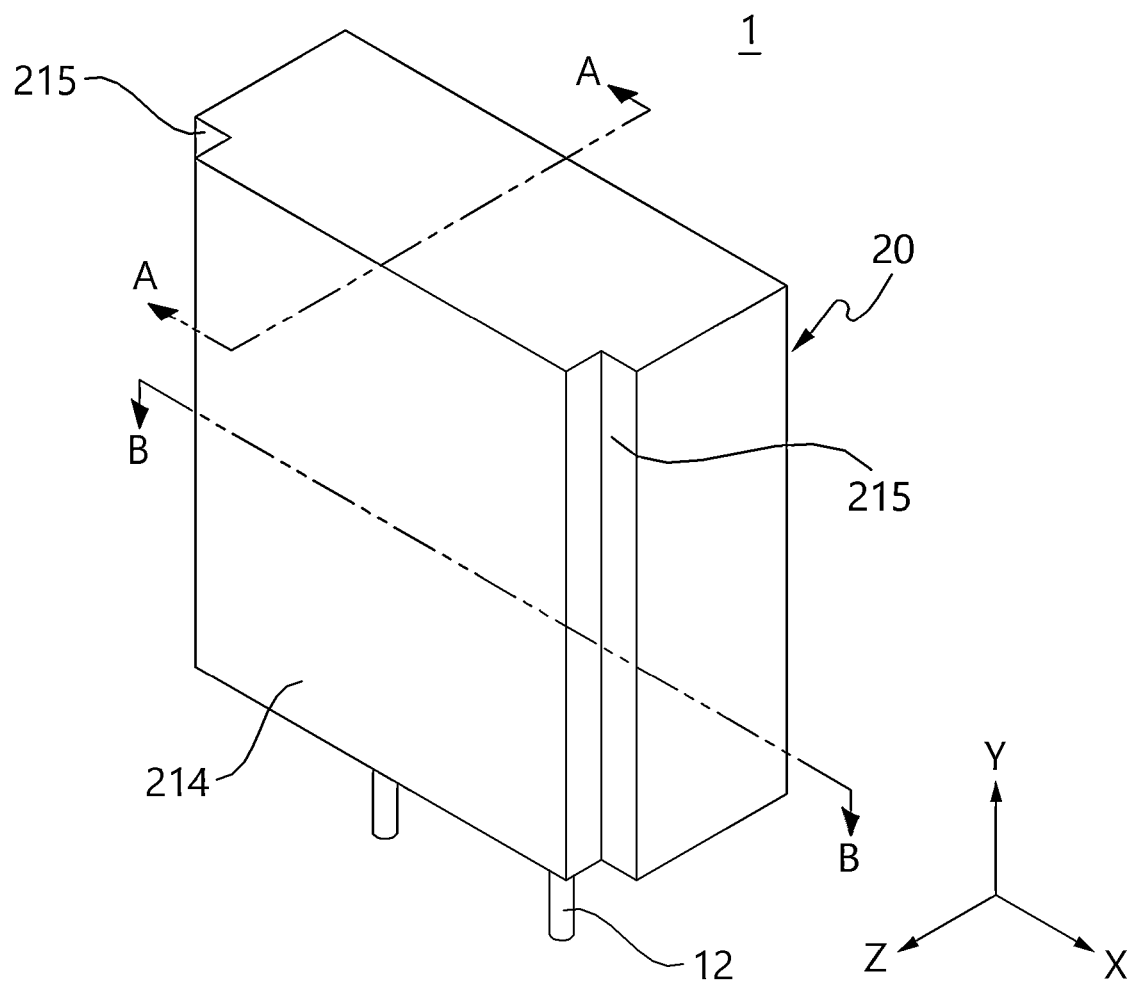
FIG. 2 is a perspective view of a circuit protection device according to an exemplary embodiment of the present invention.
Figure 3:
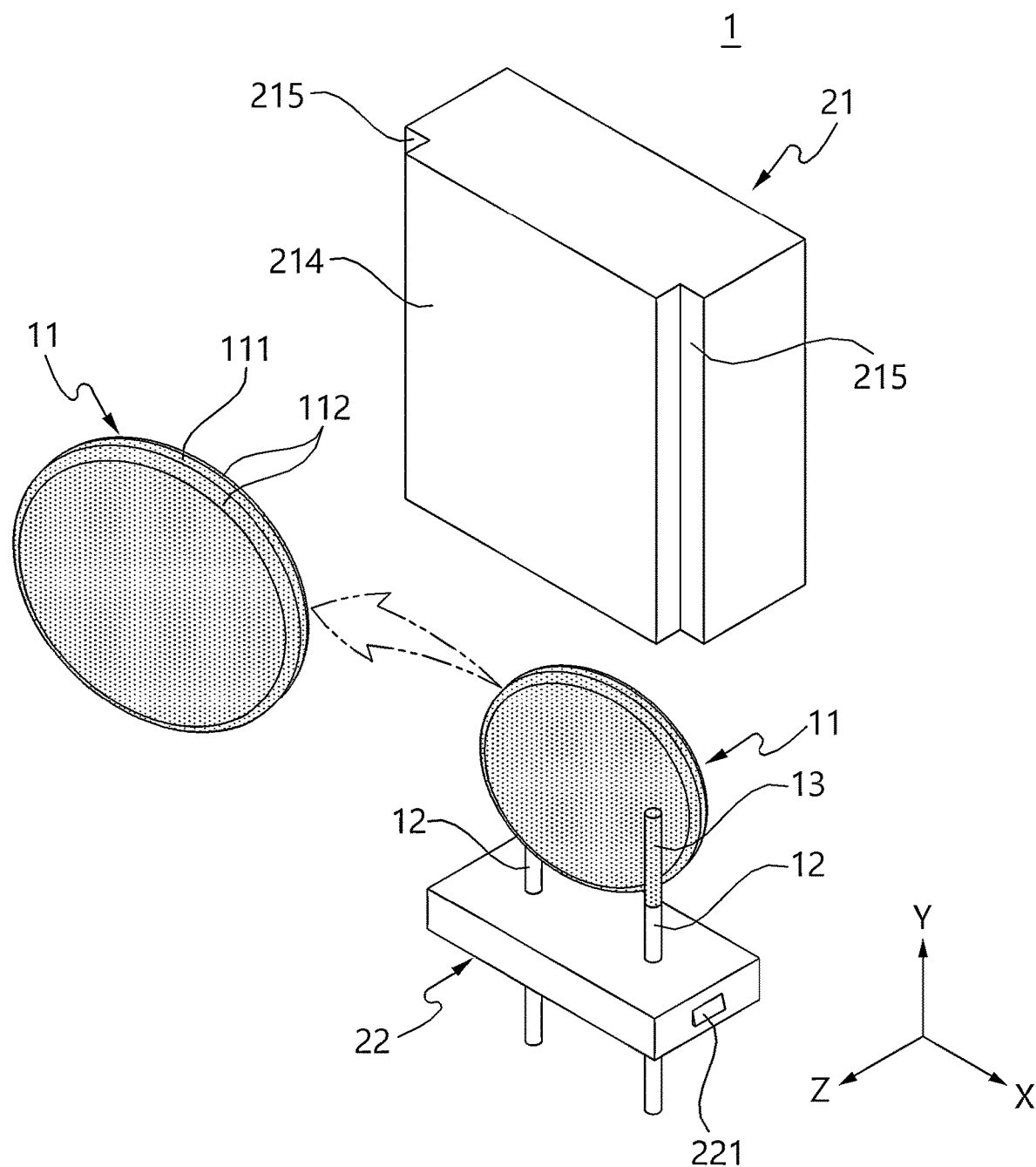
FIG. 3 is an exploded perspective view of a circuit protection device according to an exemplary embodiment of the present invention.
Figure 4:
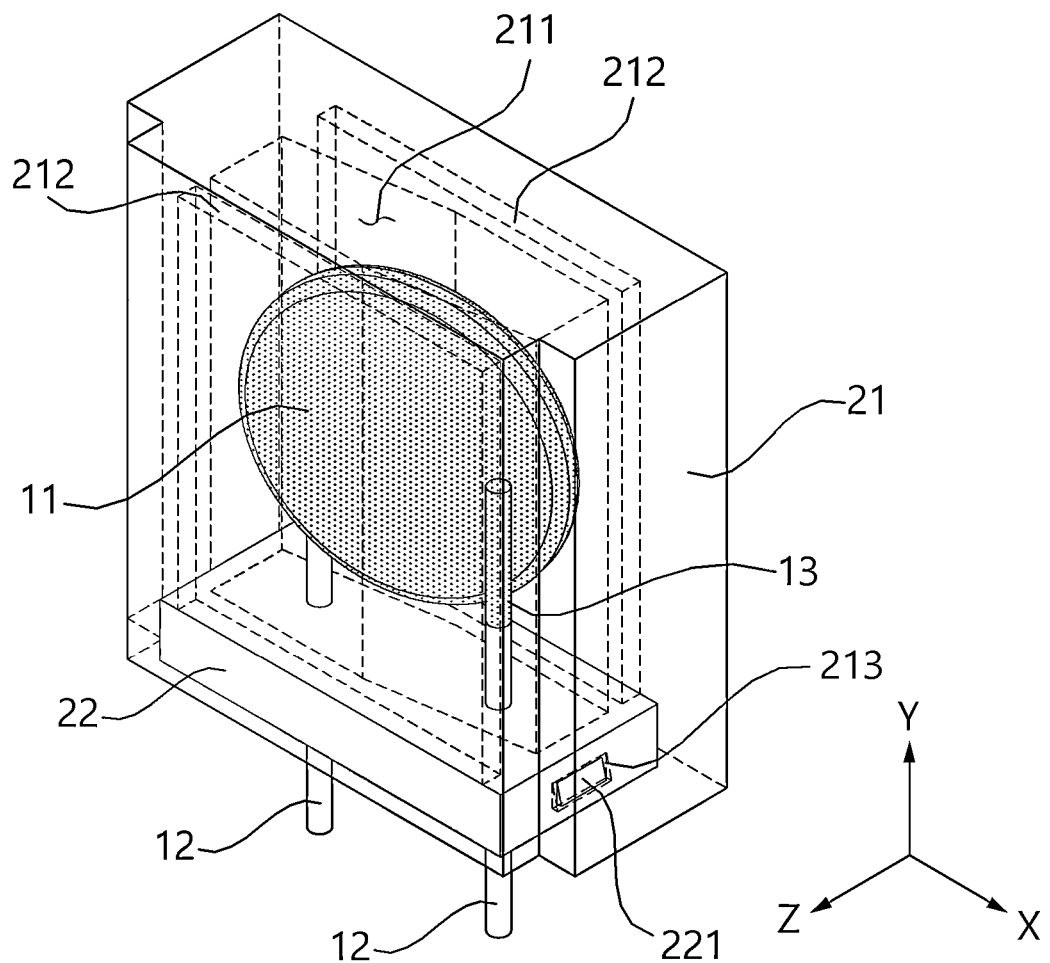
FIG. 4 is a transparent part view of a housing of a circuit protection device according to an exemplary embodiment of the present invention.
Figure 5:
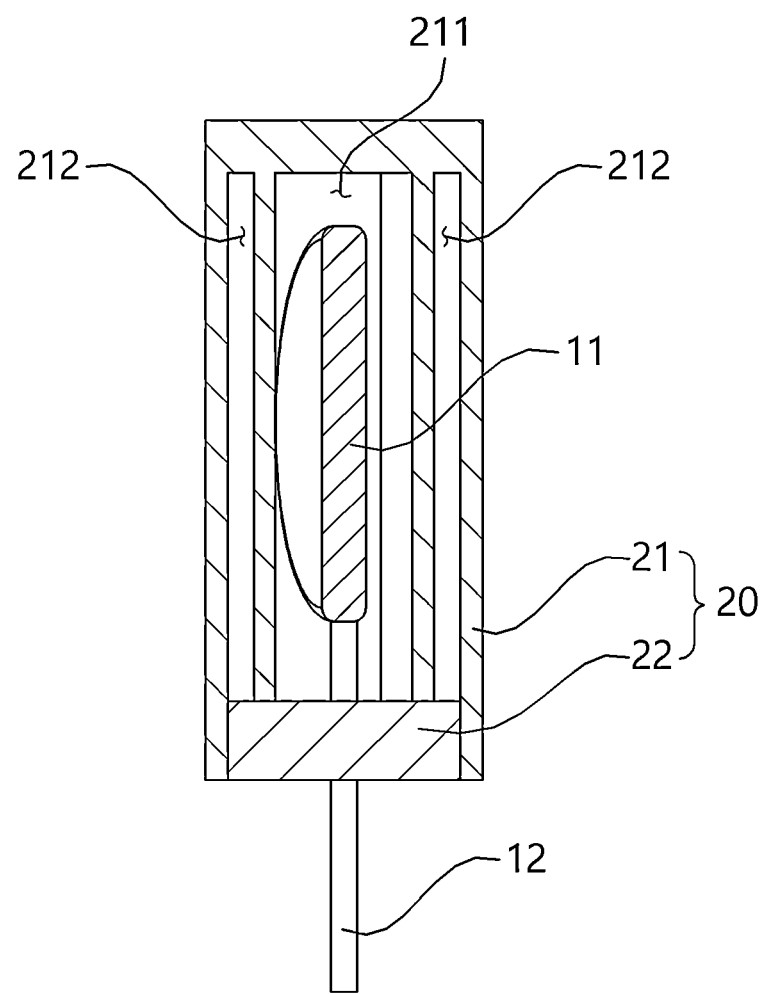
FIG. 5 is a longitudinal cross-sectional view of the circuit protection device of the present invention, taken along line A-A of FIG. 2.
Figure 6:
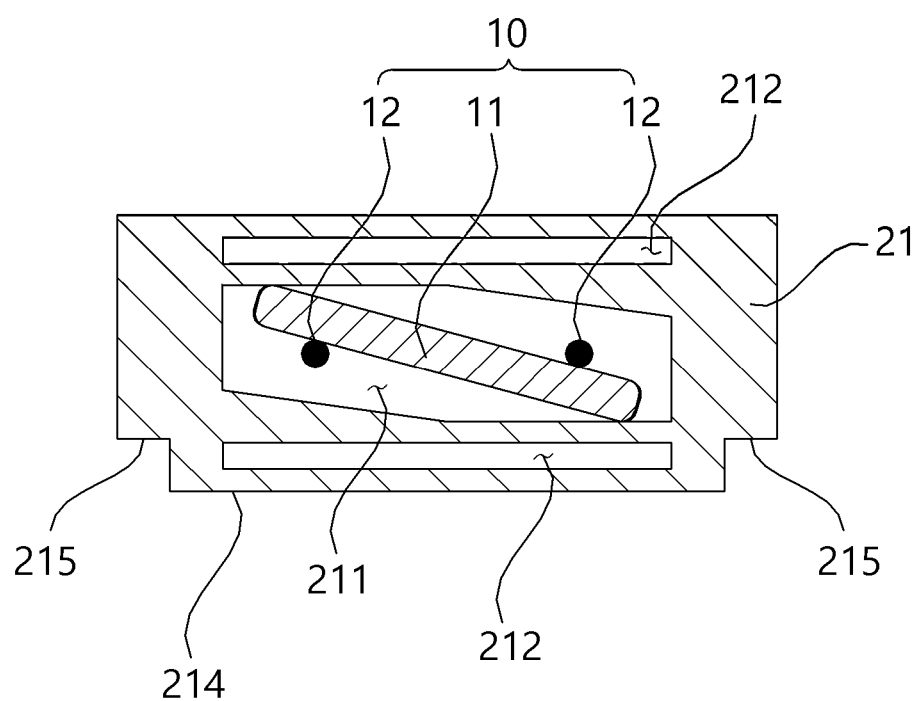
FIG. 6 is a plan cross-sectional view of the circuit protection device of the present invention, taken along line B-B of FIG. 2.
Figure 7:
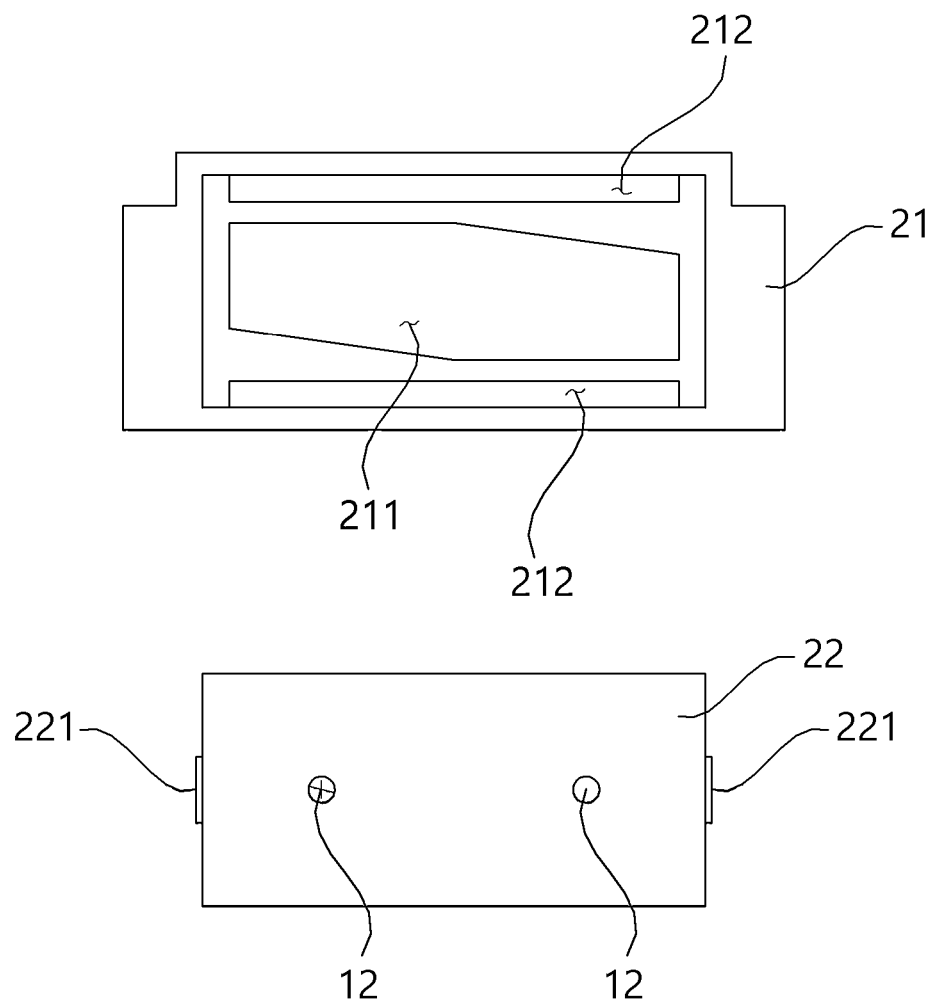
FIG. 7 is a bottom view of a circuit protection device according to an exemplary embodiment of the present invention when a housing and a housing cover are disassembled.

FIG. 2 is a perspective view of a circuit protection device according to an exemplary embodiment of the present invention, FIG. 3 is an exploded perspective view of a circuit protection device according to an exemplary embodiment of the present invention, FIG. 4 is a transparent part view of a housing of a circuit protection device according to an exemplary embodiment of the present invention, FIG. 5 is a longitudinal cross-sectional view of the circuit protection device of the present invention, taken along line A-A of FIG. 2, FIG. 6 is a plan cross-sectional view of the circuit protection device of the present invention, taken along line B-B of FIG. 2, and FIG. 7 is a bottom view of a circuit protection device according to an exemplary embodiment of the present invention when a housing and a housing cover are disassembled.

As shown in FIGS. 2 to 7, a circuit protection device 1 according to an exemplary embodiment of the present invention includes a device 10 for protecting a circuit and a case 20 configured to accommodate the device 10.

As shown in FIG. 3, the device 10 includes a heating element 11 comprised of a disk-shaped body 111 and a pair of electrodes 112 respectively provided on the front and rear sides of the body 111, and a pair of lead lines 12 each connected to each electrode 112 in the pair. The heating element 11 and the lead lines 12 of the device 10 may be partially coated with a coating material 13.

The device 10 is a negative temperature coefficient (NTC) thermistor device 10. In the NTC thermistor according to one or more exemplary embodiments, the heating element 11 is formed by firstly forming a disk-shaped ceramic body 111 that contains a plurality of types of oxides of transition elements, such as Mn, Ni, etc., and applying a silver (Ag) paste to both sides of the body 111 and baking to form the electrodes 112. Then, the lead lines 12 may be attached to the electrodes 112 of the heating element 11 by soldering, and the entire heating element 11 and at least a portion of the lead lines 12 may be coated with the coating material 13, so that the NTC thermistor device 10 can be formed.

The case 20 may be formed in a box shape having a substantially rectangular parallelepiped shape, as shown in FIGS. 2 to 7, and may be provided with an independent accommodating space 211 that accommodates the heating element 11 and at least a portion of the lead wires 12 of the device 10. Also, the case 20 and may include heat insulating layers 212 disposed in front and at the rear of the accommodating space 211.

The case 20 may include a housing 21 having an open lower surface to allow the device 10 to be inserted into the accommodating space 211, and a housing cover 22 configured to close the open lower surface of the housing 21. Protrusion latching grooves 213 are formed on both sides of the lower inner surface of the housing 21, and latching protrusions 221 corresponding to the protrusion latching grooves 213 are formed on both sides of the housing cover 22. Accordingly, when the housing cover 22 is inserted in the lower part of the housing 21, the latching protrusions 221 are caught in the protrusion latching grooves 213 so that the housing cover 22 can be firmly mounted to the housing 21. Side surfaces of the latching protrusion 221 may be formed as inclined surfaces so as to be easily inserted into the protrusion latching groove 213.

The housing 21 and the housing cover 22 may be formed of plastic excellent in heating insulating effect.

In one or more exemplary embodiments, the housing 21 may be formed of a thermosetting plastic, such as a melamine resin, an epoxy resin, a phenol resin, or the like, and the housing cover 22 may be formed of a thermoplastic plastic, such as polyethylene, polypropylene, polystyrene, polycarbonate, or the like.

Since thermosetting plastic is very rigid and has excellent resistance to heat, the housing 21 may be formed of a thermosetting plastic in the exemplary embodiment of the present invention to protect the device 10.

Since thermoplastic plastic is flexible compared to the thermosetting plastic, the housing cover 22 may be formed of the thermoplastic plastic in the exemplary embodiment of the present invention for easy coupling with the housing 21.

The accommodating space 211 located inside the housing 21 may have the open lower surface to allow the device 10 to be inserted therethrough, and may be formed to approximately conform to the shape of the device 10.

As shown in FIG. 6, the shape of the horizontal cross-section of the accommodating space may be an oblique polygonal shape to correspond to the shape of the device 10 that is formed obliquely as the lead wires 12 in the pair are coupled to opposite surfaces of the heating element 11. However, this is only one exemplary embodiment, and the shape of the horizontal cross-section of the accommodating space 211 may be formed in various shapes, such as an oblique oval formed to conform to the shape of the device 10.

The heat insulating layers 212 in a substantially rectangular parallelepiped shape having a width and height substantially similar to those of the accommodating space 211 and having a predetermined thickness may be disposed in front and at the rear of the accommodating space 211 inside the housing 21.

In the exemplary embodiment of the present invention, the heat insulating layer 212 may be an air layer. However, the exemplary embodiment is not limited thereto, and the heat insulating layer 212 may be formed as an empty space, such as a vacuum layer, or a heat insulating material layer.

As shown in FIGS. 5 and 7, the heat insulating layers 212 disposed inside the housing 21 may be formed with a lower surface opened like the accommodating space 211, and the lower surfaces of the heat insulating layers 212 may be closed by an upper surface of the housing cover 22 when the housing cover 22 is coupled to the housing 21. That is, the heat insulating layer 212 sealed by the coupling of the housing 21 and the housing cover 22, i.e., the air layer 212, is formed. However, this is merely one exemplary embodiment, and the present invention is not limited thereto, such that a sealed heat insulating layer 212, such as an air pocket or a vacuum layer, may be initially formed in the housing 21.

According to an exemplary embodiment of the present invention, steps 215 recessed into the housing 21 may be formed on both sides of the front portion of the housing 21, respectively.

In general, the height of each component installed on the printed circuit board 2 should not exceed a predetermined height (e.g., 9 mm) from the printed circuit board 2.

Figure 8:
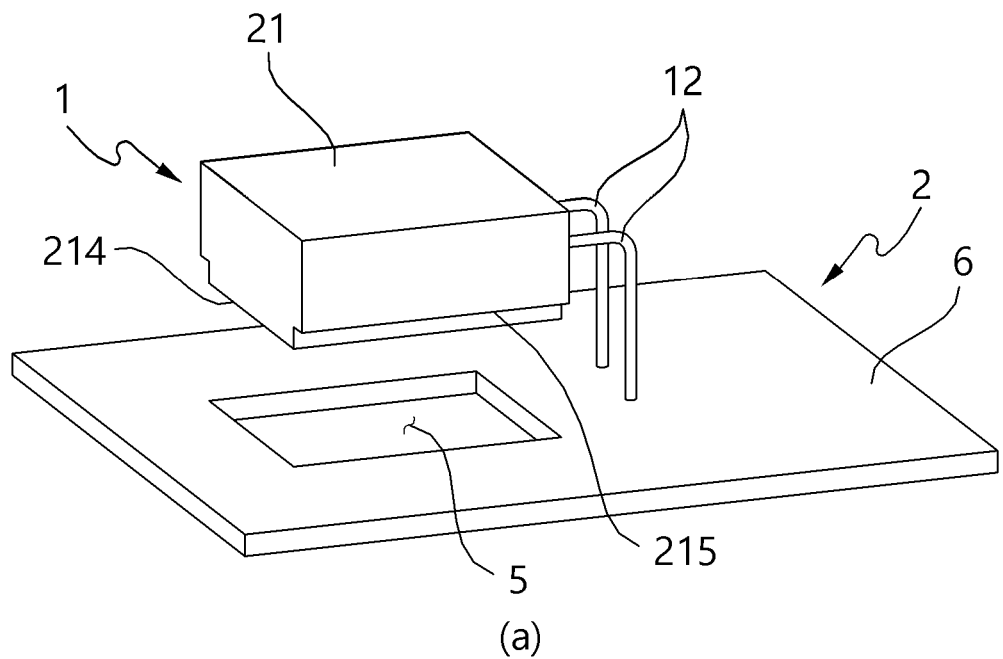
FIG. 8 is an illustration depicting a circuit protection device according to an exemplary embodiment of the present invention being installed onto a printed circuit board.
Figure 8:
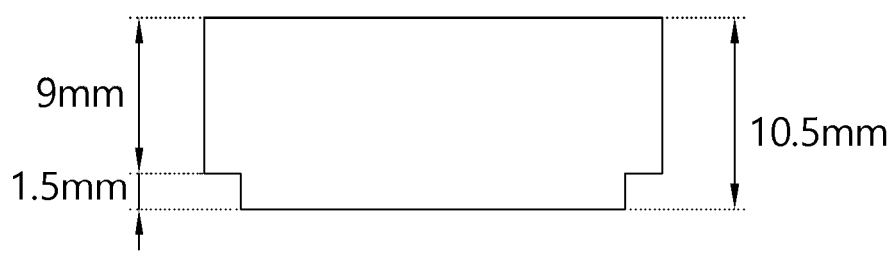
Figure 8:
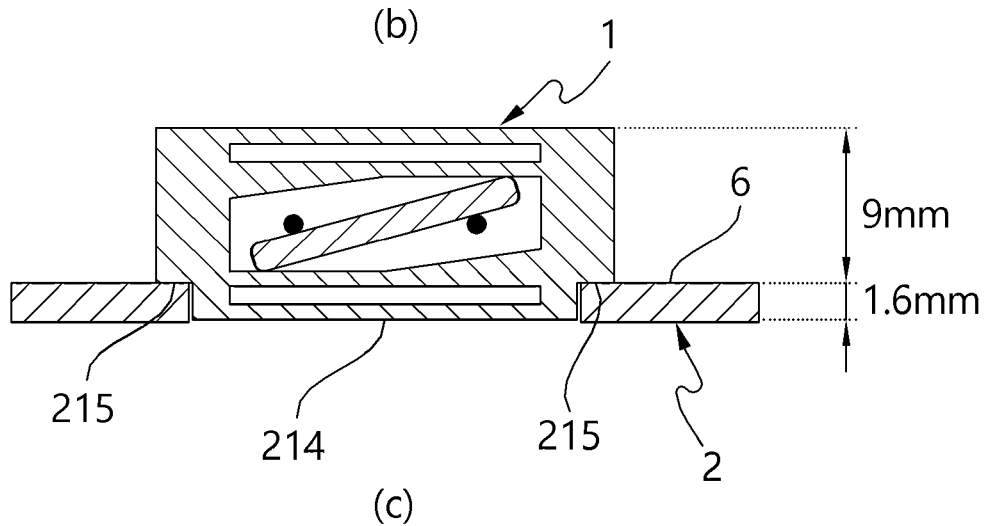

FIG. 8 is an illustration depicting a circuit protection device according to an exemplary embodiment of the present invention being installed onto a printed circuit board.

In the circuit protection device 1 according to an exemplary embodiment of the present invention, as shown in (a) of FIG. 8, the lead wires 12 may be bent at an angle of approximately 90 degrees and installed on the printed circuit board 2 in order to meet the above-described height requirement (e.g., 9 mm) for the printed circuit board 2. Then, steps 215 may be formed on both sides of the front portion of the housing 21, and a rectangular insertion hole 5 may be formed in the printed circuit board 2 to insert a part 214 of the front portion of the housing 21 thereinto. When the part 214 of the front portion of the housing 21 is inserted into the insertion hole 5 of the printed circuit board 2, the remaining part formed as the step 215 is caught on one surface 6 of the printed circuit board 2 so that the housing 21 is seated on the printed circuit board 2.

As shown in (b) of FIG. 8, the overall height of the housing 21 of the present invention is approximately 10.5 mm even in a prone position. However, as shown in (c) of FIG. 8, as the part 214 of the front portion of the housing 21 is inserted into the insertion hole 5 of the printed circuit board 2 by the steps 215 formed on both sides of the front portion of the housing 21, the height of the housing 21 protruding above the printed circuit board 2 is 9 mm or less.

According to an exemplary embodiment of the present invention, when the circuit protection device 1 of the present invention is coupled to the printed circuit board 2 as shown in (c) of FIG. 8, the heat insulating layers 212 formed on the front portion of the housing 21 are disposed inside the insertion hole 5 of the printed circuit board 2, so that the heat insulation effect by the heat insulating layers 212 formed on the front portion of the housing 21 can be further improved.

Figure 9:
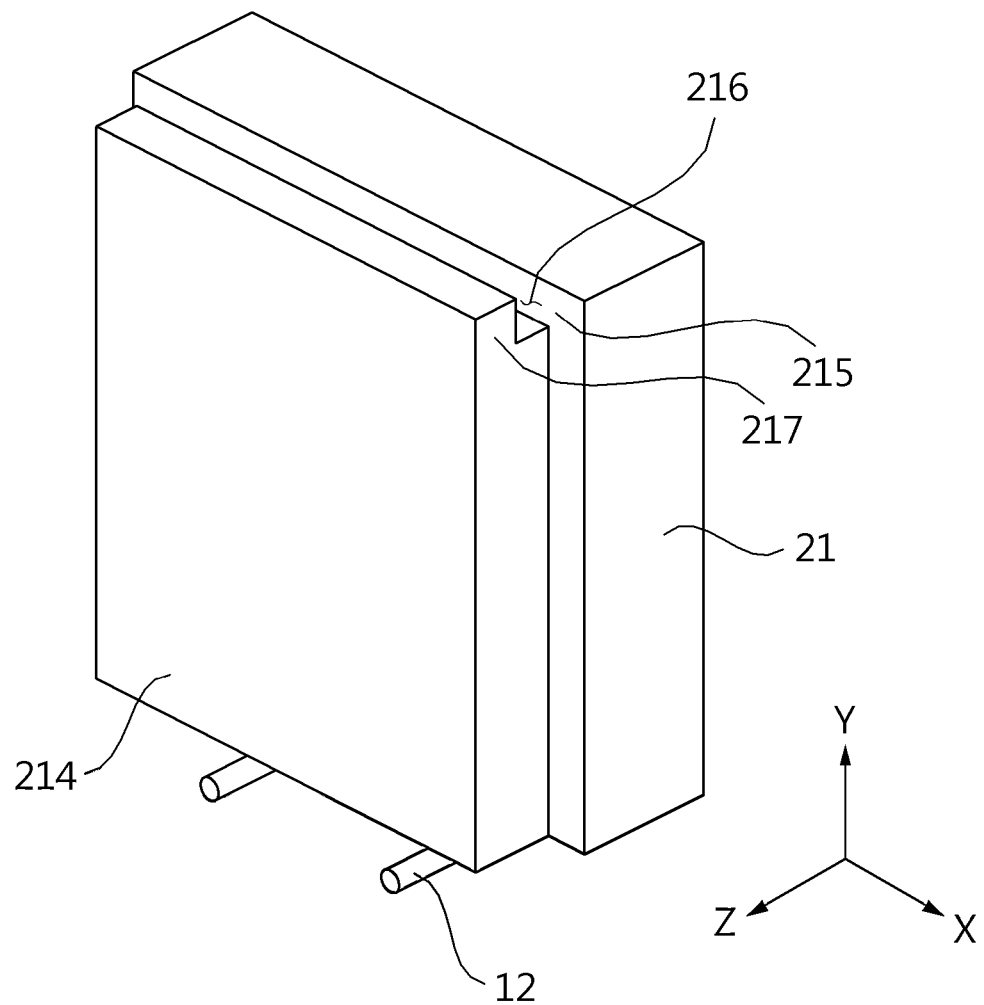
FIG. 9 is a perspective view of a circuit protection device according to another exemplary embodiment of the present invention.
Figure 10:
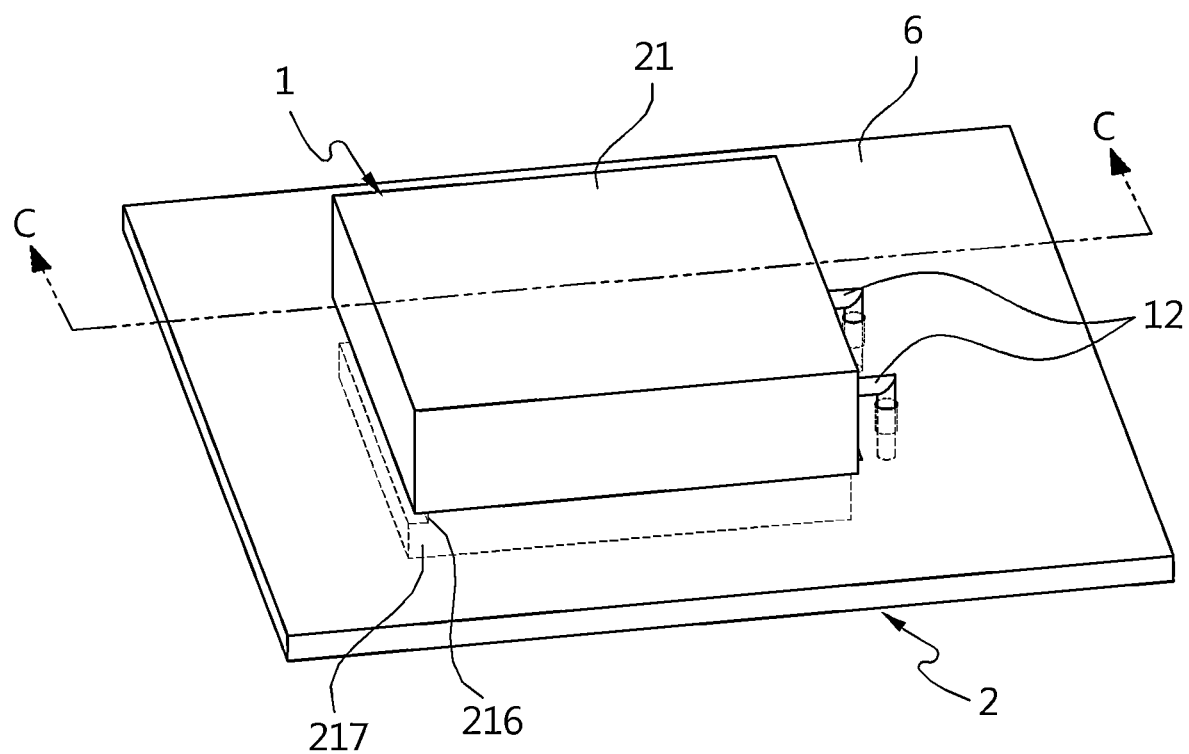
FIG. 10 is a diagram illustrating a circuit protection device according to another exemplary embodiment of the present invention installed onto a printed circuit board.
Figure 11:
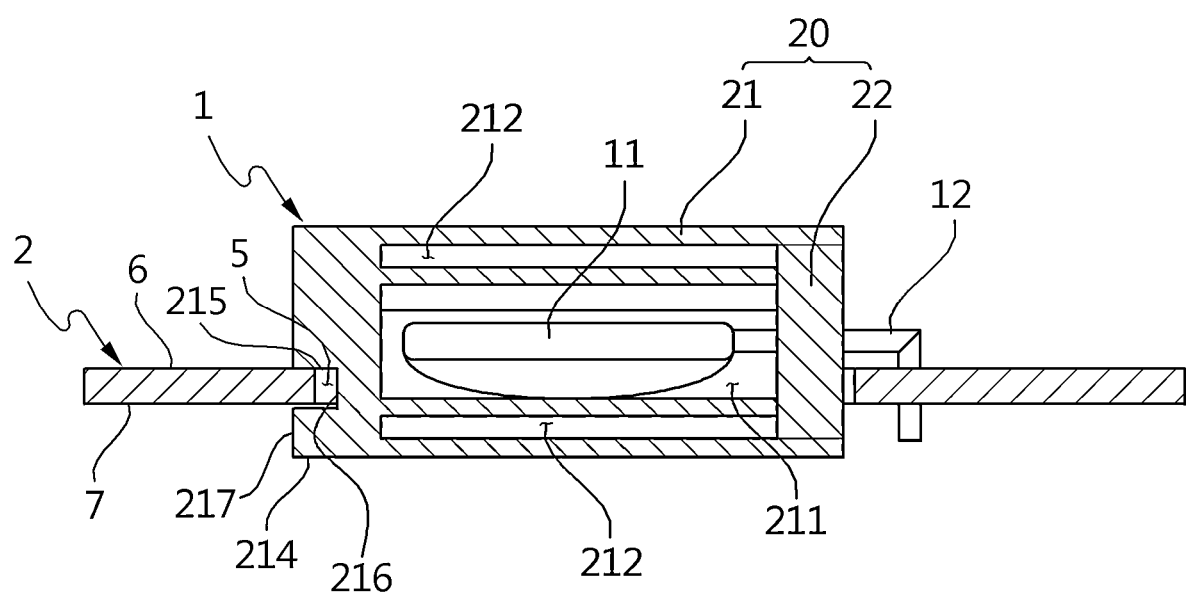
FIG. 11 is a cross-sectional view taken along line C-C of FIG. 10.

FIG. 9 is a perspective view of a circuit protection device according to another exemplary embodiment of the present invention, and FIG. 10 is a diagram illustrating a circuit protection device according to another exemplary embodiment of the present invention installed onto a printed circuit board, and FIG. 11 is a cross-sectional view taken along line C-C of FIG. 10.

The circuit protection device 1 shown in FIG. 9 is similar to the circuit protection device 1 shown in FIGS. 1 to 8, but is different in that a groove 216 in which a part of the printed circuit board 2 can be accommodated along the left-to-right direction is formed on the upper surface of the housing 21. Hereinafter, descriptions of the same configurations as those in the exemplary embodiment of FIGS. 1 to 8 will be omitted, and the following description will focus on differences.

As shown in FIG. 9, a step 215 may be formed along the upper portion and both sides of the front portion of the housing 21 and a groove 216 may be formed such that a stepped portion 217 is formed at a position spaced apart a predetermined distance from the step 215 formed on the upper portion. The width of the groove 216 is substantially equal to or slightly larger than the thickness of the printed circuit board 2 so as to accommodate the printed circuit board 2.

As shown in FIGS. 10 to 11, when the circuit protection device 1 of FIG. 9 is installed on the printed circuit board 2, a part of the printed circuit board 2 is inserted into the groove 216 so that the step 215 of the housing 21 is caught on the upper surface 6 of the printed circuit board and the stepped portion 217 of the housing is caught on the lower surface 7 of the printed circuit board. Accordingly, even when an external impact is applied to the printed circuit board, the circuit protection device 1 can be stably fixed without being dislodged from neither of the upper surface 6 and the lower surface 7 of the printed circuit board 2.

According to an exemplary embodiment of the present invention, the case 20 including the housing 21 and the housing cover 22 as described above achieves an advantage in that the manufacturing process of the circuit protection device 1 is simplified compared to the prior art.

Conventionally, a ceramic case into which the NTC device is inserted is separately manufactured, the NTC device is disposed therein, and then the ceramic case is filled with a cement-based filler, following by primarily drying the filler at room temperature and secondarily heat-curing to manufacture a circuit protection device ICL. Hence, the manufacturing process is complicated and time consuming, and the material cost, such as the cement filler, the ceramic case, and the like, increases.

However, according to an exemplary embodiment of the present invention, as shown in FIG. 3, the housing cover 22 to which the lead wires 12 of the NTC device 10 is coupled may be manufactured at one time by producing the housing 21 by injection molding, placing the NTC device 10 in a mold, and injection molding the housing cover 22. Then, by coupling the housing 21 to the housing cover 22, the circuit protection device 1 is completed. Thus, the manufacturing process of the circuit protection device 1 of the present invention is very simple, so that the manufacturing time can be reduced. In addition, according to the present invention, there is no need to use ceramic, filler, or the like, and thus there is an advantage in that manufacturing cost can be reduced by reducing material cost.

The case 20 according to the exemplary embodiment of the present invention exhibits an effect opposite to that of the conventional ceramic case and the cement-based filler filled in the ceramic case. Conventionally, the ceramic case and the cement-based filler filled therein have an effect of externally dissipating heat generated from the NTC thermistor device accommodated inside the case, whereas, since the case 20 is formed as a plastic case with excellent thermal insulation properties and the heat insulating layers 212 are formed in front and at the rear of the accommodating space 211 accommodating the NTC device 10, the case 20 according to the exemplary embodiment of the present invention has an effect of confining the heat, generated from the NTC device 10, inside the case 20.

Since the NTC device 10 has a characteristic that the resistance value reduces when the temperature increases, according to the present invention, as opposed to the prior art, heat is confined inside the case 20 to further increase the temperature of the NTC element 10 accommodated in the case 20, thereby reducing the resistance value of the NTC device 10 and accordingly reducing heat generation ($P=I^2R$, Joule heat).

Figure 12:
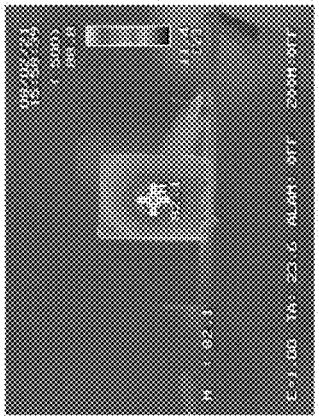
FIG. 12 is a table showing comparative test data between a conventional circuit protection device (ICL) and a circuit protection device (ICM) according to an exemplary embodiment of the present invention.
Figure 12:
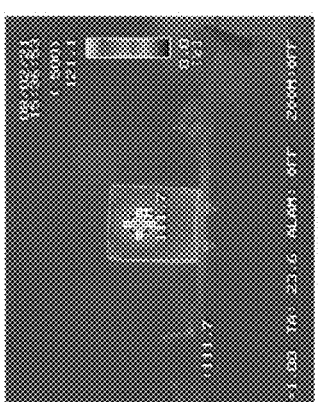
Figure 12:
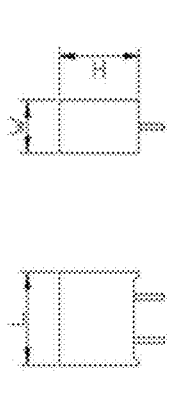
Figure 12:
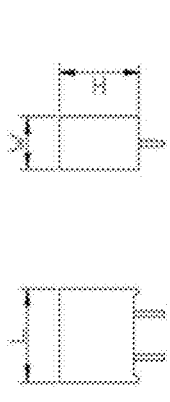

FIG. 12 is a diagram illustrating comparative test data between a conventional circuit protection device (ICL) and a circuit protection device (ICM) according to an embodiment of the present invention.

Before conducting the test by applying power, the resistance value of the NTC device 10 was set equal to approximately 5.2 ohms, and the same current (3.5 A) was applied for the same time (20 minutes) to measure the heat generation of the conventional circuit protection device (ICL) and the circuit protection device (ICM) 1 according to the exemplary embodiment of the present invention. As a result, as shown in FIG. 12, in the case of the conventional circuit protection device (ICL), the temperature of the portion that generates heat the most is 111.7° C. and similar temperature is observed in the surrounding portion. Whereas, in the case of the circuit protection device (ICM) 1 according to the exemplary embodiment of the present invention, the temperature of the portion that generates heat the most is 82.1° C., which is about 30° C. lower than that of the prior art, and it is found that the temperature rapidly drops towards the periphery.

Looking at the test data of FIG. 12, in the prior art, the resistance value of the NTC device drops to 0.274 ohms, whereas, in the present invention, the resistance value of the NTC device significantly drops to 0.171 ohms due to the insulation performance of the case and thus it is observed that the heating temperature is lowered by approximately 30° C.

As shown in FIG. 12, the size of the circuit protection device (ICM) 1 according to the exemplary embodiment of the present invention is approximately 22.5 mm in length, 27 mm in height, and 10 mm in width, which is slightly larger than the size of the conventional circuit protection device (ICL) (L:20 mm, H:24 mm, W:9.5 mm). However, as shown in FIG. 1, for a recently released home appliance (e.g., TV) that requires large power consumption in excess of 200 W, the conventional circuit protection device (ICL) is required to be used together with both the first and second relays S1 and S2, and thus the overall size of the circuit protection device becomes very large; whereas, according to the present invention, the circuit protection device (ICM) 1 shown in FIG. 2 can be used alone, so that it can be formed, as a whole, in a very small size compared to the prior art. That is, one circuit protection device (ICM) 1 of the present invention has an effect of replacing both the conventional circuit protection device (ICL) and the first and second relays S1 and S2.

Therefore, in the case of the circuit protection device 1 according to the exemplary embodiment of the present invention, when compared to the prior art, the manufacturing process is simple, a smaller space is occupied, heat generation can be reduced, and the manufacturing cost can be reduced.

Figure 13:
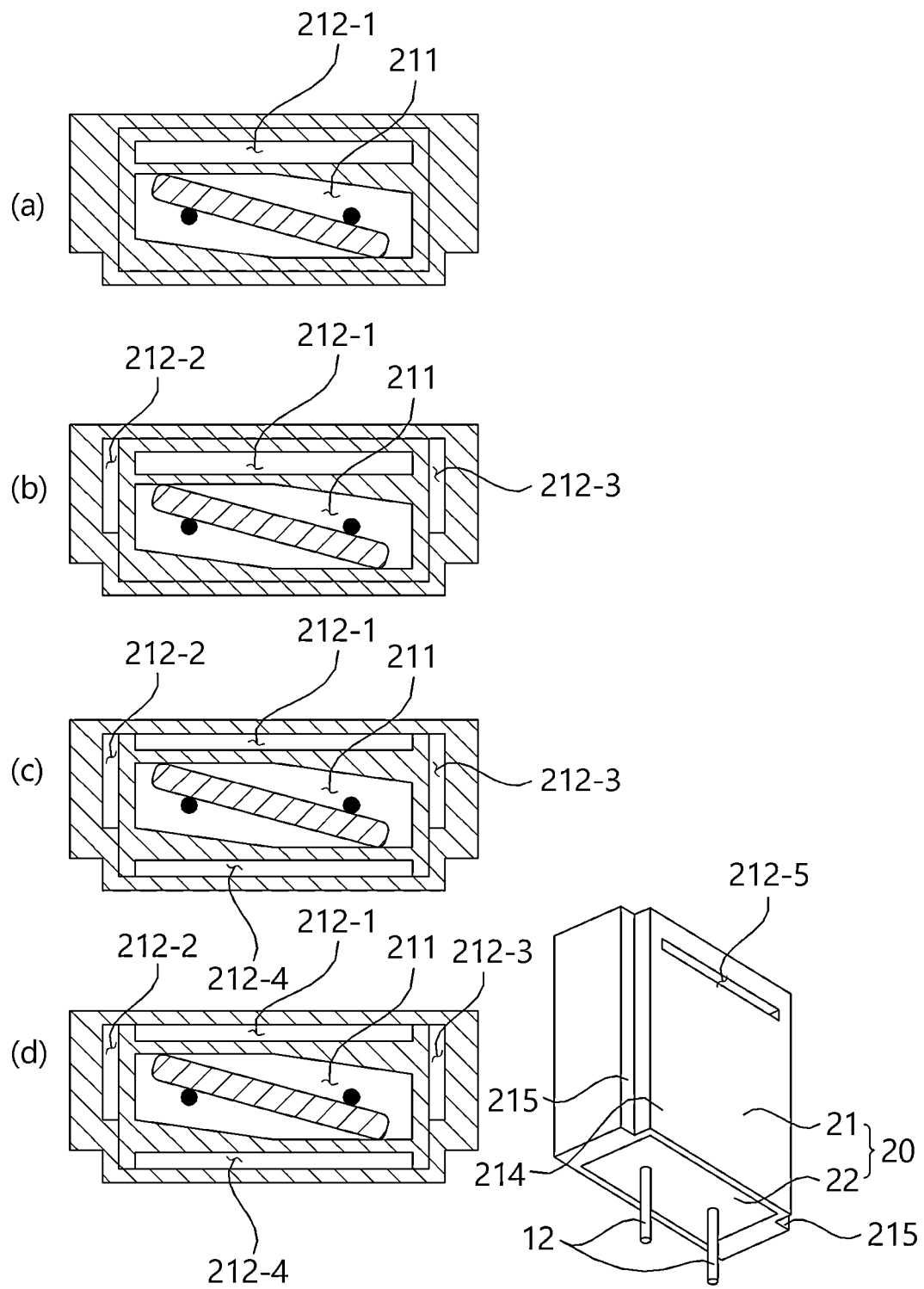
FIG. 13 is a plan cross-sectional view of a circuit protection device according to various embodiments of the present disclosure.

FIG. 13 is a plan cross-sectional view of a circuit protection device according to various exemplary embodiments of the present invention.

In the exemplary embodiments shown in FIGS. 2 to 7, the circuit protection device 1 has a structure in which two heat insulating layers are provided in front and at the rear of the accommodating space 211 of the NTC device 10, respectively. FIG. 13 (a) to (b) illustrate circuit protection devices having a different number of heat insulating layers.

In (a) of FIG. 13, an exemplary embodiment is in which one heat insulating layer 212-1 is provided at the rear of the accommodating space 211. In this case, the heat insulating layer 212-1 may be formed to be larger than each of the heat insulating layers 212 shown in FIGS. 2 to 7.

In (b) of FIG. 13, an exemplary embodiment is illustrated in which heat insulating layers are provided at the rear of and also on the left and right sides of the accommodating space 211, so that a total of three heat insulating layers 212-1, 212-2, and 212-3 surround the accommodating space 211. In this case, similarly to the structure described above in (a) of FIG. 13, the heat insulating layer 212-1 disposed at the rear of the accommodating space 211 may be formed to be larger than each heat insulating layer 212 shown in FIGS. 2 to 7.

In (c) of FIG. 13, an exemplary embodiment is illustrated in which heat insulating layers are provided in front, at the rear, and on the left and right sides of the accommodating space 211, so that a total of four heat insulating layers 212-1, 212-2, 212-3, and 212-4 surround the accommodating space 211. In this case, the heat insulating layers 212-1 and 212-4 disposed in front and at the rear of the accommodating space 211 may be formed to have substantially the same size as the heat insulating layers 212 shown in FIGS. 2 to 7.

In (d) of FIG. 13, an exemplary embodiment is illustrated in which a heat insulating layer 212-5 is further provided on the upper side of the accommodating space 211 in the structure of (c) in FIG. 13 in which the four heat insulating layers 212-1, 212-2, 212-3, and 212-4 are provided. In one or more exemplary embodiments, as shown in (d) of FIG. 13, the upper heat insulating layer 212-5 may be formed as an air layer with an open front portion through which air passes in and out.

FIG. 14 is a table showing comparative test data for circuit protection devices according to various exemplary embodiments of the present invention.

In FIG. 14, the structure of (a) of FIG. 13 has the heat insulating layer 212-1 on only one side of the accommodating space 211 and is denoted as "one-side," the structure of the exemplary embodiment of FIGS. 2 to 7 has the heat insulating layers 212 on both front and rear sides of the accommodating space 211 and is denoted as "two-side," the structure of (b) of FIG. 13 has the heat insulating layers 212-1, 212-2, and 212-3 at the rear and on the left and right sides of the accommodating space 211 and is denoted as "three-side," the structure of (c) of FIG. 13 has the heat insulating layers 212-1, 212-2, 212-3, and 212-4 on the front, rear, left, and right sides of the accommodating space 211 and is denoted as "four-side," and the structure of (d) of FIG. 13 has the heat insulating layers 212-1, 212-2, 2123, 212-4, and 212-5 on the front, rear, left, right, and upper sides of the accommodating space 211 and is denoted as "five-side".

Before conducting the test by applying power, the resistance value of the NTC device 10 was set equal to approximately 5.2 ohms, and the same current (3.5 A) was applied for the same time (20 minutes) to measure the heat generation of the conventional circuit protection device (ICL) and the circuit protection device (ICM) 1 according to various exemplary embodiments of the present invention. As a result, as shown in FIG. 14, in the case of the conventional circuit protection device (ICL), the temperature of the portion that generates heat the most is 111.7° C., whereas, in the circuit protection devices (ICM) according to the various exemplary embodiments including "one-side" to "five-side," the temperature of the portion that generates heat the most is approximately 75.3° C. to 82.1° C., which is significantly lower than that in the prior art.

Looking at the experimental data of FIG. 14, in the case of the prior art, the resistance value of the NTC device dropped to 0.274 ohm, whereas, in the case of the circuit protection devices according to the various embodiments of the present invention, the temperature of the NTC device significantly drops to approximately 0.170 ohms to 0.171 ohms due to the insulation performance of the case and thus a low heating temperature is observed.

The circuit protection device according to the exemplary embodiment of the present invention reduces the resistance value of the NTC device during operation by disposing a heat insulating layer (air layer) in the vicinity of the accommodating space of the case that accommodates the NTC device to confine heat inside the case, and accordingly achieves an effect of reducing the generated heat by approximately 30° C. when compared to the prior art.

The circuit protection device according to the exemplary embodiment of the present invention may replace the conventional two relays and a ceramic heat dissipation element (ICL), and hence it may occupy a smaller space and also solve the problem of malfunction or durability deterioration due to the use of relays.

Further, the circuit protection device according to the exemplary embodiment of the present invention may reduce the manufacturing cost, and reduce the manufacturing time due to the simple manufacturing process thereof.

While the exemplary embodiments have been particularly shown and described with reference to certain exemplary embodiments thereof, it will be understood by one of ordinary skill in the art that various changes in form and details may be made therein without departing from the spirit and scope of the exemplary embodiments as defined by the following claims. The exemplary embodiments should be considered in a descriptive sense only and not for purposes of limitation. Therefore, the scope of the exemplary embodiments is defined not by the detailed description of the exemplary embodiments but by the following claims, and all differences within the scope will be construed as being included in the exemplary embodiments.

What is claimed is:

1. A circuit protection device comprising:
   a device comprising a heating element configured to comprise a body and a pair of electrodes formed on the body, and a pair of lead wires connected, respectively, to the pair of electrodes; and
   a case having a housing, at least one wall extending within the housing, and an independent accommodating space formed in part by the at least one wall extending within the housing to accommodate at least the heating element,
   wherein the case includes at least one heat insulating layer disposed between the housing and the at least one wall extending within the housing and in the vicinity of the accommodating space, and
   wherein the at least one heat insulating layer is a sealed heat insulation layer having an air pocket or a vacuum layer initially formed in the case.

2. The circuit protection device of claim 1, wherein the device is a negative temperature coefficient (NTC) thermistor device.

3. The circuit protection device of claim 1, wherein the housing comprises an open lower surface to allow the device to be inserted into the accommodating space, and wherein the case comprises a housing cover configured to close the open lower surface of the housing.

4. The circuit protection device of claim 3, wherein the housing has a rectangular parallelepiped shape.

5. The circuit protection device of claim 4, wherein the heat insulating layer is formed on at least one of a front side and a rear side of the accommodating space in the housing.

6. The circuit protection device of claim 4, wherein the heat insulating layer is formed on an upper side of the accommodating space in the housing.

7. The circuit protection device of claim 4, wherein the heat insulating layer is formed on at least one of left and right sides of the accommodating space in the housing.

8. The circuit protection device of claim 1, wherein the case is formed of plastic.

9. The circuit protection device of claim 3, wherein one of the housing and the housing cover is formed of thermosetting plastic and the other is formed of thermoplastic plastic.

10. The circuit protection device of claim 4, wherein the housing has a step formed on a front portion or a rear portion thereof so that a part of the front or rear portion of the housing can be inserted and installed into a housing insertion hole formed in a printed circuit board.

11. The circuit protection device of claim 3, wherein the housing has a groove that accommodates a part of a printed circuit board when a part of the housing is inserted into a housing insertion hole formed in the printed circuit board.

* * * * *